W. M. CLARK.
PHONOGRAPHIC APPARATUS AND COMBINED PHONOGRAPHIC AND MOVING PICTURE APPARATUS.
APPLICATION FILED OCT. 24, 1914.

1,388,516.

Patented Aug. 23, 1921.

4 SHEETS—SHEET 1.

W. M. CLARK.
PHONOGRAPHIC APPARATUS AND COMBINED PHONOGRAPHIC AND MOVING PICTURE APPARATUS.
APPLICATION FILED OCT. 24, 1914.
1,388,516.
Patented Aug. 23, 1921.
4 SHEETS—SHEET 3.
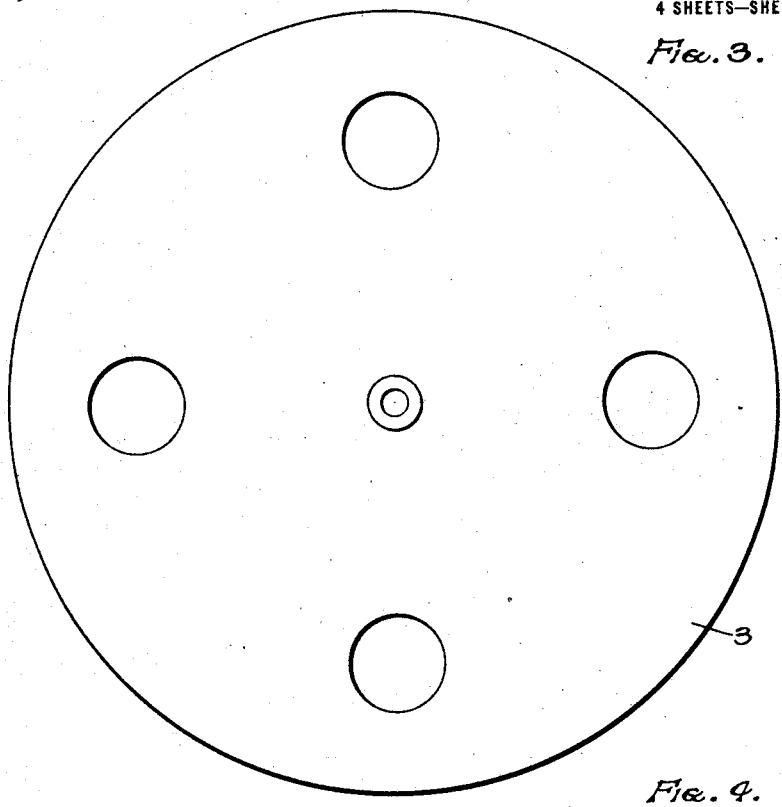
Fig. 3.
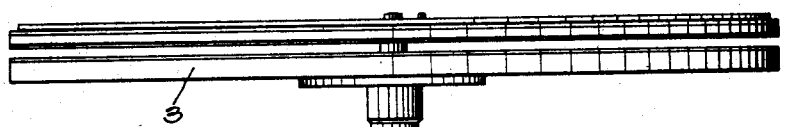
Fig. 4.
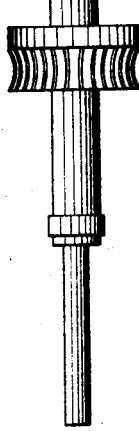
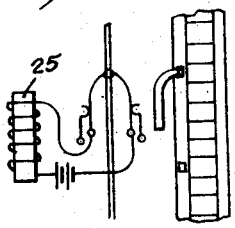
Fig. 5.
WITNESSES
B. Garber
Chas. McCandy
INVENTOR
W. M. Clark
by
ATTORNEY

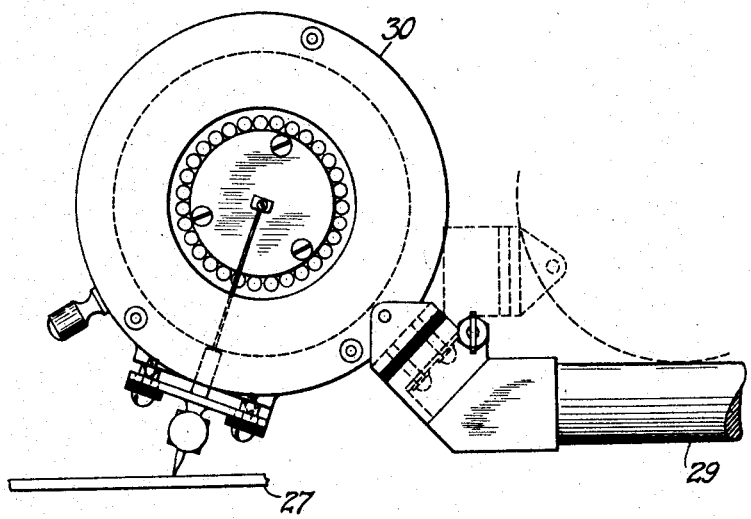

UNITED STATES PATENT OFFICE.

WILLIAM M. CLARK, OF CHICAGO, ILLINOIS.

PHONOGRAPHIC APPARATUS AND COMBINED PHONOGRAPHIC AND MOVING-PICTURE APPARATUS.

1,388,516.   Specification of Letters Patent.   Patented Aug. 23, 1921.

Application filed October 24, 1914. Serial No. 868,495.

*To all whom it may concern:*

Be it known that I, WILLIAM M. CLARK, a citizen of the United States of America, and resident of Chicago, Cook county, Illinois, have invented certain new and useful Improvements in Phonographic Apparatus and Combined Phonographic and Moving-Picture Apparatus, of which the following is a specification.

My invention relates to an improved form of phonographic apparatus for use in combination with moving picture apparatus. Heretofore it has been difficult to work phonographic apparatus and moving picture apparatus in satisfactory synchronism, and I have devised a new means for bringing the two together to avoid the difficulty heretofore encountered. One of the old arrangements was to provide a groove on the outer rim of the record along which the needle might run until the phonographic apparatus acquired the proper speed before cutting into the record proper. With this old arrangement it was impossible to start without a preliminary run of the apparatus and it was therefor impossible to start in the middle of a record without providing a blank space to permit the device to arrive at a proper speed. With my arrangement I am able to use an ordinary standard stock record, pick up the words or music or any sound at any point, leave off at any point, stop between words, or pick out from the record any particular melody or subject or any particular portion of the subject which is desired to the exclusion of the rest.

Among the objects of my invention are the following: To provide phonographic equipment with means for starting and stopping the record in such a manner that the pitch of the sound is prevented from varying and affecting the ear, without disengaging the needle from the record; to provide means for controlling the phonographic apparatus through the moving picture equipment, and to provide certain details and features of improvement tending to increase the efficiency and serviceability of apparatus of the above character.

To accomplish the foregoing and other useful ends I provide means hereinafter more fully set forth and claimed.

Figure 1:
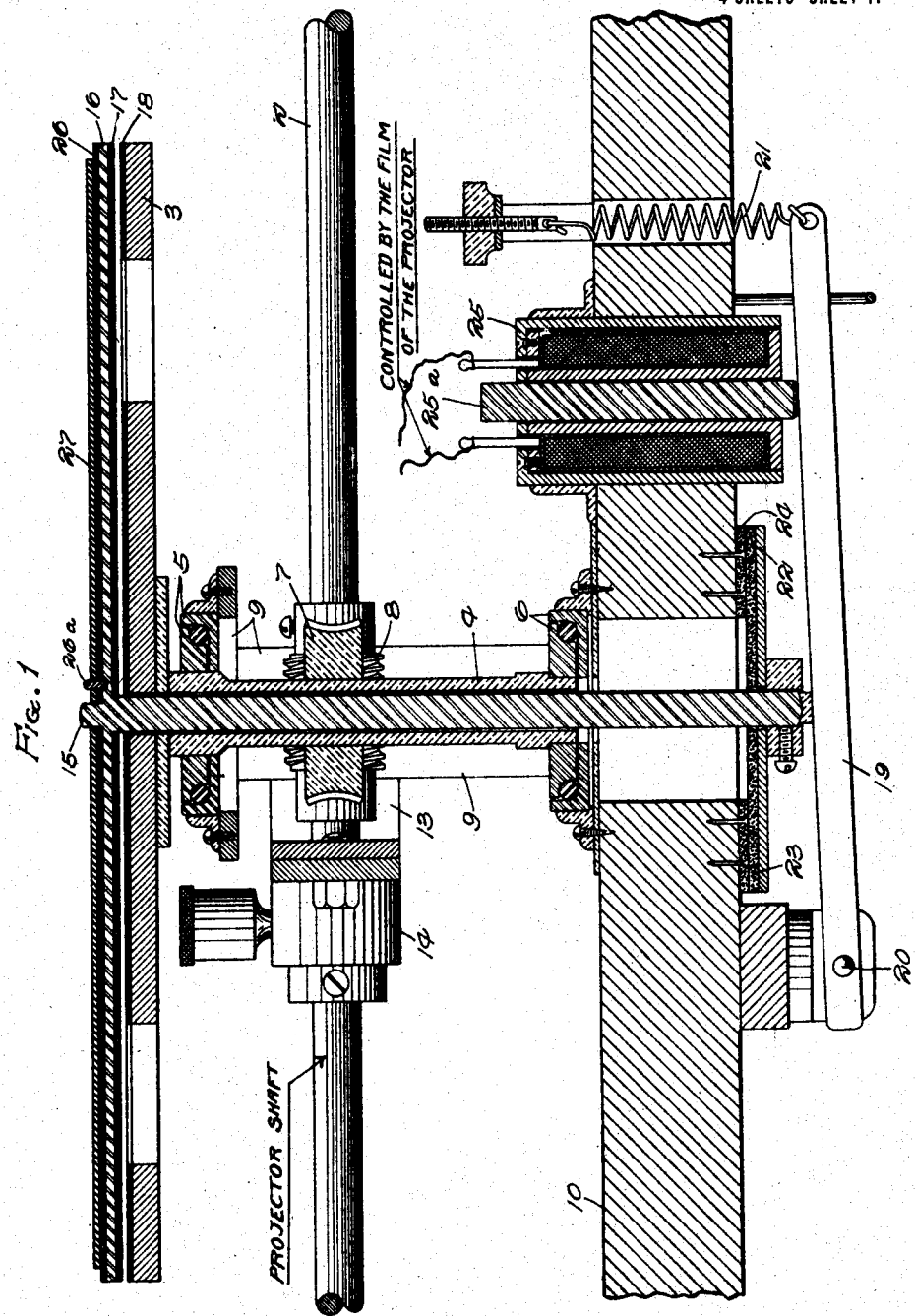
Figure 2:
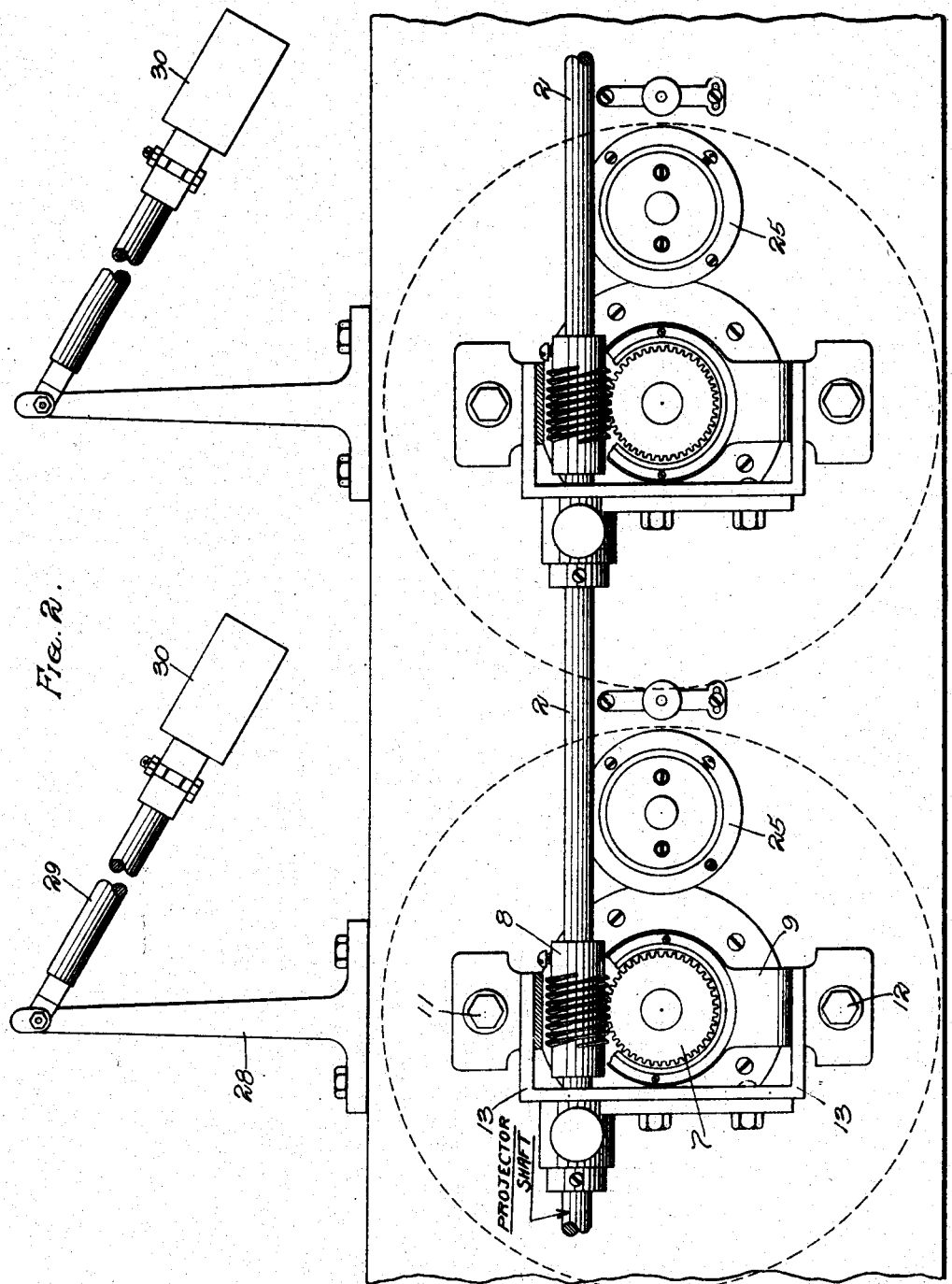

Referring to the drawings, Figure 1 is a sectional elevation of one section of the phonographic equipment. Fig. 2 is a top view of the same apparatus showing two sections of the same, each section being practically a duplicate of the other. Fig. 3 is a top view of the table which carries the record. Fig. 4 is a side view of the table, record disk and supports. Fig. 5 is a diagrammatic representation showing the relation of one of the controlling magnets and the film of the moving picture machine. Fig. 6 is a side elevation of the reproducer.

Referring to these drawings, the shaft 2 is connected to any suitable driving mechanism such as an electric or other form of motor. Along the shaft there are mounted any suitable number of tables 3. Each table 3 is attached to a hollow spindle 4. Each spindle 4 is provided with bearings 5 and 6. Secured to each spindle 4 there is a gear 7, which meshes with the corresponding worm 8 of the driving shaft 2. Therefore when the shaft revolves the spindle 4 will be rotated and consequently the table 3 will be rotated likewise. The bearings 5 and 6 are mounted on a yoke 9 which is secured to the bed 10 by bolts 11 and 12. This yoke bridges over the gears 7 and 8 and passes just under the table 3, as shown. On the side of each of these bridges is an auxiliary bridge 13 which supports the bearing 14 for the shaft 2. Passing through the hollow spindle 4 there is a second spindle 15 on the upper end of which there is secured a comparatively light plate 16. The end of this plate is provided with a covering 17 of felt, or other material, while the upper surface of the plate 3 is similarly provided with a similar covering 18. On the underside of the base 10 there is a lever 19 supported at one end in a pivot 20 and at the other end by the spring 21. This lever 19 passes under and normally engages with the lower end of the spindle 15, thereby normally holding the same raised, as shown in Fig. 1, with the surfaces 17 and 18 disengaged. The spindle 15 as shown, passes through the base 10 and is provided with a plate 22, the upper surface of which is covered by a leather disk 23, or other similar material. The base 10 has the section immediately above the disk 23 similarly covered by the leather or other disk 24, so that normally the surfaces 23 and 24 are maintained in engagement as shown. Associated with the lever 19 and for controlling the same, there is provided a solenoid magnet 25. When energized this magnet, through the medium of its plunger 25ª, can depress the lever 19 and permit the spindle to fall, thereby causing the surfaces 23 and 24 to disengage and the surfaces 17 and 18 to engage. As a result the motion of the table 3 is imparted to the disk 16 as long as the table is being spun by the shaft 2. Upon the deënergization of the magnet 25 the surfaces 17 and 18 are separated and the surfaces 23 and 24 are brought into engagement, thereby bringing the plate 16 to practically a sudden stand still. The upper surface of the disk 16 is also lined with a felt pad 26, upon which an ordinary phonographic record plate is permitted to rest. In the upper surface of this disk I provide a pin 26ª which is adapted to engage a hole or slot in the record plate so as to insure the record always being placed in one and the same position every time. Behind each of the tables and of the mechanism immediately associated therewith there is secured to the base 10 an elbow arm 28, which extends rearwardly and then rises to a point above the level of the disk 16. To the upper end of the arm 28 there is pivotally secured an arm 29 which is free to swing in a horizontal plane over the plate 27. Furthermore, this arm is also adapted to swing in a vertical plane. At the outer end of the arm there is mounted a machine transmitter 30 of any suitable character for example one similar to that shown in French Patent No. 450,767. It will be seen therefore that while the shaft is being driven the table 3 will spin and it will be seen also that by energizing and deënergizing the magnet 25 the phonographic plate 27 and the disk 16 may be started and stopped almost instantaneously, due to the friction surfaces 17 and 18 on one side and 23 and 24 on the other. Obviously, therefore, the machine transmitter 30 may be swung over to cause it to engage with the record 27. As long as the record continues to revolve, which it does while the magnet 25 is energized, the record can be reproduced audibly, and by deënergizing the magnet 25 the record may be brought to a stand still immediately because of the brake action of the surfaces 23 and 24. In fact the stoppage is so short that the audible reproduction will cease practically suddenly, and in fact so suddenly that there will be no perceptible lowering in the pitch of the sound as would be the case were the record stopped not so suddenly. On the other hand, by energizing the magnet 25 the disk 16 and record 27 can be started so suddenly that the subject of the record may be resumed without any appreciable variation in pitch as would be the case if the record were started more slowly; that is, if the record were not allowed to attain its normal speed practically instantaneously. This phonographic machine is designed to work in connection with moving picture apparatus, if desired. When so used the magnet 25 (Fig. 1) and likewise the other similar magnets of other similar sections (Fig. 2) may be controlled from the film. It will be understood that the same motor that drives the phonographic apparatus may drive the moving picture projector also. In fact the projector shaft and the shaft 2 may be brought into direct connection through the medium of a universal joint, for example. The magnet 25 may be controlled by clips of any suitable character on the moving picture film or upon a film a duplicate of the moving picture film running together with it. The clip may be made to actuate an intermediate magnet which can control a step by step switch which will in turn control the magnet 25 in such a manner that at one step the switch will energize the magnet 25 and hold it energized until the next step, thereupon the magnet 25 will deënergize and remain deënergized until the next step, and so on. On the film there can be a separate set of clips for each magnet 25. With this arrangement a moving picture film can be started and a couple of records can be mounted on a couple of tables such as shown in Fig. 2, in engagement with which record the machine transmitter 30 may be placed. As soon as the moving picture film advances to a point where it is desired to bring in the left hand record, for example, a clip on the film will operate directly or indirectly the circuit of the magnet which controls the step by step switch so as to advance it one step to cause the energization of the magnet 25. The magnet 25 thereupon energizes and starts the record off instantly. The reproduction from this record continues until the next clip on the film operates the circuit of the intermediate magnet, thereby causing it to advance the step by step switch one step further, thereby breaking the circuit of the magnet 25 and bringing the record to a stand still leaving the needle, of course, in engagement with the record. The film continues to progress until it reaches a point when it is necessary to bring in the left hand record again, whereupon the magnet 25 is again energized. This energization and deënergization of the magnet 25 continues until the record is exhausted, whereupon the magnet 25 is deënergized throwing the record out. At the same instant that the magnet 25 is energized, the magnet 25 of the right hand record, Fig. 2, is energized bringing the second record into service, which record may be a continuation of the subject matter of the first record. This switching from one record to another may be instantaneous or not. If the switching has to be instantaneous the magnet of the right hand record must energize at the same instant that the magnet of the left hand record deënergized, otherwise the magnet 25 of the right hand record will not energize until some later time when the proper clip of the film will operate a second step by step intermediate switch which controls the magnet 25 of the right hand record. It will thus be seen that while one record is in operation the other record can be changed and put in readiness to be used as soon as the first one is exhausted. The relation of the magnet 25 to the film is shown in Fig. 5. The film which is shown at the right passes through a pair of contacts that are included in the energizing circuit of the magnet 25. Whenever the relation of the phonograph to the film requires it an opening is provided in the film which permits the contacts in the magnet circuit to come together as shown in Fig. 5 for the purpose of energizing the magnet 25. As the film continues its motion the contacts are again separated and the circuit of the magnet again interrupted.

In the old type of apparatus the phonograph was at one point and the moving picture projector was at another, and the means for driving the two was of such a character as to permit one shaft to fall behind the other. With the present arrangement both shafts are permanently connected so as to make this impossible, and together with that, the arrangement by means of which the clips on the film throw the phonograph into action instantly insures a permanent synchronized condition. Furthermore, this means by which the phonograph can be brought into action instantaneously enables me to use the ordinary standard record, and furthermore enables me to pick out from any record any section of the record which is desired by previously setting the machine transmitter at the proper point and it further enables me to work in consecutive sections of the record in combination with the moving picture projector without any loss of motion or space in the record. Instead of having the phonograph at one point and the moving picture apparatus at a different point as has been done heretofore and having to connect the two by undesirable intermediate mechanical contrivances, I substitute phonographic reproducers for the phonographs at the distant point or points and connect these reproducers electrically with the machine transmitter. I can, of course, have as many machine transmitters as I desire and I may locate them wherever I desire without the fear of having them get out of synchronism with the moving picture machine because of any intervening mechanical contrivance.

It will be understood that in the control action of the magnets I do not wish to limit myself to clips as I have already indicated one set of clips for each separate magnet with an intermediate circuit controller. I may instead use perforations in the film to control valves after the fashion that they are controlled in piano players. This valve can be made to control the intermediate step by step circuit controlling device for the magnets 25. Furthermore, this step by step intermediate circuit controller can be varied, and can be in the nature of a cam which when advanced to one position will close the circuit of the magnet 25, and which when advanced to a different position will open the circuit of the magnet 25, and so on alternately.

It will be seen also that I may vary the control of the clutch mechanism by substituting for the lever 19 a cam arrangement which may be controlled by the magnet 25. This cam mechanism may be of such a character that when the magnet 25 energizes the cam operates to raise the shaft 15. When the magnet 25 energizes again it will operate to lower the shaft 15. Further, when the magnet is again energized, the cam arrangement will operate to again raise the shaft 15 and so on, that is, the magnet 25 by receiving impulses from the controlling mechanism, can be made to alternately raise and lower the shaft 15. This arrangement will avoid the necessity of having to retain the magnet 25 energized to hold the shaft 15 raised. It will be understood that the clutch mechanism can, of course, be varied. For example, instead of having a flat type of clutch, one of cone type may be substituted or even one of a gear type.

From the foregoing it will be seen that with the equipment which I have described, it is possible to use the records shown in Fig. 2 either consecutively, or, for example, while the left hand record is operating the right hand record can be thrown in and out to operate in conjunction and in duet with the left hand record.

What I claim as my invention is:

1. In a phonograph, a record, a record driving element, means for driving the same, mechanism for bringing said record and said element into operative engagement and for disengaging said element and record, a brake, means independent of gravity for operating said brake to stop said record, and a single magnet for controlling the operation of said mechanism.

2. In a phonograph, a record, a record driving element, means for driving the same, mechanism for moving said record into and out of engagement with said element, a brake, means independent of gravity for operating said brake to stop said record, and a single magnet for controlling the operation of said mechanism.

3. In a phonograph, a record, a record driving element, means for driving the same, a clutch for moving said record into engagement with said element having one gripping member secured to said element and moving therewith, said record mounted on the other gripping member of said clutch to move therewith, a brake, and a single magnet for controlling the operation of said clutch and said brake.

4. The combination of a phonograph, a record, a record driving element, a shaft for driving said element, means for driving said shaft, a moving picture machine having a projector and a film associated therewith, means controlled by said film for moving said record into engagement with said element, said projector driven by said shaft, a brake, and means independent of gravity for operating said brake to stop said record.

5. The combination of a phonograph, a record associated therewith, a moving element, mechanism for moving said record into engagement with said element to rotate said record, a brake for stopping said record, a single magnet for controlling said mechanism and said brake, a moving picture machine having a projector and a film, said magnet controlled by said film.

6. The combination of a phonograph, a record associated therewith, a moving element, mechanism for moving said record into engagement with said element to rotate said record, a brake for stopping said record, a single magnet for controlling said mechanism and said brake, a moving picture machine having a projector and a film, said film driven by said element and controlling the operation of said magnet.

7. In a phonograph, a record, a support for said record, a driving element associated therewith, means for driving said element, a clutch having one gripping member secured to said support and another gripping member secured to said element, means for moving said support to bring said gripping members into engagement to drive said record and for again moving said support to disengage said members to stop said record, a single magnet for controlling the movement of said support, and a brake for stopping said record.

8. The combination of a phonograph, a record, a support for said record, a driving element associated therewith, means for driving said element, a clutch having one gripping member secured to said support and another gripping member secured to said element, a brake, a magnet for operating said clutch to drive said record and for controlling said brake to stop the record, a moving picture machine having a projector and a film driven by said element, said magnet controlled by said film.

9. In a phonograph, a record, a record driving element, means for driving said element, a record support, said support movable in a vertical plane, a clutch at one end of said support and a brake at the other end of said support, means for moving said support in one direction to drive said record through the medium of said clutch and driving member and for moving the support in the other direction to stop the record through the medium of said brake.

10. In a phonograph, a record, a record driving element, means for driving said element, a record support, said support movable in a vertical plane, a clutch at one end of said support and a brake at the other end of said support, means for moving said support in one direction to drive said record through the medium of said clutch and driving member and for moving the support in the other direction to stop the record through the medium of said brake, and a magnet for controlling said means.

11. In a phonograph, a record, a record driving element, means for driving said element, a record support, said support movable in a vertical plane, a clutch at one end of said support and a brake at the other end of said support, means for moving said support in one direction to drive said record through the medium of said clutch and driving member and for moving the support in the other direction to stop the record through the medium of said brake, a moving picture apparatus also driven by said element, said means controlled by said apparatus.

12. In a phonograph, a record, a record-driving element, means for driving the same, a magnet for bringing said record and said element into operative engagement and for disengaging said element and record, a brake, and a spring for operating said brake to stop said record.

13. In a phonograph, a record, a support for said record, a driving element associated therewith, means for driving said element, a clutch having one gripping member secured to said support and another gripping member secured to said element, a magnet for moving said support to bring said gripping members into engagement to drive said record, a spring for again moving said support to disengage said members to stop said record, and a brake for stopping said record.

14. In a phonograph, a record, a record driving element, means for driving said element, a record support, said support movable in a vertical plane, a clutch at one end of said support and a brake at the other end of said support, means for moving said support in one direction to drive said record through the medium of said clutch and driving member, and a spring for moving the support in the other direction to stop the record through the medium of said brake.

15. In a phonograph, a record, a record driving element, means for driving said element, a record support, said support movable in a vertical plane, a clutch at one end of said support and a brake at the other end of said support, a magnet for moving said support in one direction to drive said record through the medium of said clutch and driving member and a spring for moving the support in the other direction to stop the record through the medium of said brake.

16. A phonograph having associated therewith a magnet and a spring working in opposition for starting and stopping the phonograph, and a moving picture film for controlling the magnet.

Signed by me at Chicago, Illinois, this 16th day of October, 1914.

W. M. CLARK.

Witnesses:
B. GARBER,
CHAS. M. CANDY.